United States Patent [19]

Dever et al.

[11] Patent Number: 5,346,965

[45] Date of Patent: Sep. 13, 1994

[54] PROCESS FOR THE PRODUCTION OF FUEL ADDITIVES FROM CHLORINATED POLYBUTENES

[75] Inventors: James L. Dever, Copley; Mannat C. Menon, Macedonia; Steven D. Phillips, Solon; Larry J. Baldwin, Berea, all of Ohio

[73] Assignee: Ferro Corporation, Cleveland, Ohio

[21] Appl. No.: 109,226

[22] Filed: Aug. 19, 1993

[51] Int. Cl.$^5$ ............................................... C08F 8/32
[52] U.S. Cl. .................................... 525/379; 525/378; 525/380; 525/381; 525/382; 525/366; 525/367
[58] Field of Search ............... 525/379, 378, 380, 381, 525/382, 374, 366, 367; 528/488, 490, 492, 501

[56] References Cited

U.S. PATENT DOCUMENTS

| | | | |
|---|---|---|---|
| 3,454,555 | 7/1969 | van der Voort et al. | 564/369 |
| 3,480,580 | 11/1969 | Joyner et al. | 525/263 |
| 3,579,486 | 5/1971 | McConnell et al. | 525/379 |
| 3,671,511 | 6/1972 | Honnen et al. | 525/379 |
| 4,032,700 | 6/1977 | Jong et al. | 525/379 |
| 4,055,402 | 10/1977 | Battersby et al. | 44/58 |
| 4,382,005 | 5/1983 | Miller | 252/32.7 |
| 4,832,702 | 5/1989 | Kummer et al. | 525/379 |

OTHER PUBLICATIONS

*Encyclopedia of Polymer Science and Engineering*–vol. 2, pp. 590–605.
Joseph P. Kennedy, *Carbocationic Polymerization,* John Wiley & Sons, New York, pp. 468–481 (1981).

*Primary Examiner*—James J. Seidleck
*Assistant Examiner*—Mark L. Warzel
*Attorney, Agent, or Firm*—Renner, Kenner, Greive, Bobak, Taylor and Weber

[57] ABSTRACT

A process for preparing a polybutene amine composition comprises the steps of reacting a chlorinated polybutene with an excess of at least one mole of at least one type of an amine compound per mole of the chlorinated polybutene at a reaction temperature of at least about 100° C.; neutralizing the reaction mixture with a base selected from the group of alkali metal and alkaline earth metal alkoxides and amides with formation of one of an alcohol or ammonia, respectively; neutralizing any excess base with an acid that will produce essentially no water as a by-product; and recovering the polybutene amine composition, the process including the steps of removing the alcohol or ammonia in a timely fashion; and removing excess of the amine compound.

14 Claims, No Drawings

PROCESS FOR THE PRODUCTION OF FUEL ADDITIVES FROM CHLORINATED POLYBUTENES

TECHNICAL FIELD

The present invention relates to a process of producing polybutene amine fuel additives. More particularly, it relates to an improved process of producing polybutene amine deposit control additives in the absence of water, wherein excess amine reactant is recovered and undesirable side-products such as cyclic ureas and related products are avoided. The present invention also generally provides a process for the recovery of amine salts from a variety of amine-containing waste streams. From an environmental consideration, not only are amines recovered before they are lost to become pollutants, but the process of recovery does not contaminate water or produce water.

BACKGROUND ART

Deposit-control fuel additives effectively control deposits in carburetors, valves and fuel injectors of engine intake systems. Aminated polybutenes are widely employed as deposit control fuel additives. Aminated polybutenes are produced commercially by one of two processes which involve the reaction of chlorinated polybutene with an amine compound to produce a polybutene amine. These prior art processes, however, are characterized by the preparation of undesirable side-products and the creation of a large volume of contaminated aqueous waste streams.

U.S. Pat. No. 3,671,511, represents the primary process employed to produce polybutene amines today. It involves the reaction of chlorinated polybutene with an excess of polyamine, stripping the excess amine under vacuum, adding aromatic solvent to dilute the reaction mixture, and neutralizing the reaction mixture with aqueous sodium hydroxide. This step forms an emulsion which is broken by adding butanol. The phases are separated and the organic layer is washed several times before being dried and diluted with the desired solvent. This process has many disadvantages. One mole of excess amine per mole of reacted chlorinated polybutene is not recovered during stripping and ultimately is discarded in an aqueous layer. This results in the loss of a valuable raw material and is an economic and environmental disadvantage. The large volume of aqueous waste streams which contain amine, traces of aromatic solvent, and butanol represents a serious disposal problem and an economic as well as an environmental disadvantage. The butanol adds to the cost of the process since it cannot be recovered, and the necessity of performing multiple washes increases cycle time and manufacturing costs.

U.S. Pat. No. 3,454,555 describes the second most frequently used process to prepare polybutene amines and describes a system which overcomes many process-related problems associated with aqueous waste streams, lost butanol and amine, and multiple washes. It has a different problem, however, which renders its product unacceptable to the customer. This process involves the reaction of an excess of polyamine with a chlorinated polybutene in the presence of sodium carbonate. When the reaction is completed the excess amine is removed by vacuum stripping, the reaction mixture is filtered to remove inorganic salts, and the product is diluted with a suitable solvent to the desired basic nitrogen level. The disadvantage of this process is that the carbon dioxide produced as a by-product reacts with the excess amine and the product to produce other by-products. These by-products are insoluble in the product and, with time, precipitate out to form a solid phase which creates many problems for the customer. Removal of this solid phase adds substantial cost.

Thus, the prior art has not provided a process for the production of polybutene fuel additives from chlorinated polybutenes which avoids the foregoing undesirable side reactions.

DISCLOSURE OF THE INVENTION

It is therefore an object of the present invention to provide a process for the manufacture of polybutene amine fuel deposit control additives without the undesired by-products and environmental disadvantages of prior art processes.

It is another object of the present invention to provide a process for the manufacture of polybutene amine fuel deposit control additives wherein substantially all of the excess amine may be recovered.

It is yet another object of the present invention to provide a process for the manufacture of polybutene amine fuel deposit control additives which does not involve the use of aqueous bases or bases which react to form water.

It is yet another object of the present invention to provide a process for the manufacture of polybutene amine fuel deposit control additives which does not require the use of water for recovery.

It is yet another object of the present invention to provide a process for the manufacture of polybutene amine fuel deposit control additives which does not require the use of butanol or other emulsion-breaking additives known to those skilled in the art.

It is still another object of the present invention to provide a process for the manufacture of polybutene amine fuel deposit control additives which does not necessitate multiple water washings of the reaction product.

It is a further object of the present invention to provide a process for the manufacture of polybutene amine fuel deposit control additives which does not involve carbon dioxide and, therefore, avoids the formation of undesirable urea and related compounds.

It is a still further object of the present invention to provide a process for the recovery of amine salts from amine-containing waste streams.

At least one or more of the foregoing objects and advantages of the invention set forth herein are accomplished by the present invention as hereinafter described and claimed.

In general, the present Invention provides a process for preparing a polybutene amine composition comprising the steps of reacting a chlorinated polybutene with an excess of at least one mole of at least one type of an amine compound per mole of the chlorinated polybutene at a reaction temperature of at least about 100° C.; neutralizing the reaction mixture with a base selected from the group of alkali metal and alkaline earth metal alkoxides and amides with formation of one of an alcohol or ammonia, respectively; reacting any excess base with an acid that will produce essentially no water as a by-product; and recovering the polybutene amine composition, the process including the steps of removing the alcohol or ammonia in a timely fashion; and removing excess of the amine compound.

PREFERRED EMBODIMENT FOR CARRYING OUT THE INVENTION

The present invention is directed toward the manufacture of polybutene amine fuel deposit control additives without the undesired by-products or environmental disadvantages of prior art processes.

The objects of the invention have been accomplished through a process for the manufacture of polybutene amine fuel deposit control additives which comprises the general steps of reacting chlorinated polybutene with an excess of amine, cooling the reaction mixture, neutralizing the reaction mixture with a base selected from the group of alkali metal and alkaline earth metal alkoxides and amides with formation of one of an alcohol or ammonia, respectively; neutralizing any excess base with an acid that will produce essentially no water as a by-product; and recovering the polybutene amine composition. The process includes the additional steps of removing the alcohol or ammonia in a timely fashion; and removing excess of the amine compound. Recovery is conducted by any conventional means such as cooling and adding a small amount of aromatic solvent to improve viscosity, filtering the reaction mass to remove inorganics, and diluting the final product with an aromatic solvent to the desired percent basic nitrogen.

Chlorinated polybutenes are prepared by chlorinating commercially available polybutenes. The number average molecular weight of the commercial polybutenes is generally greater than about 400, preferably from about 400 to about 3,000, more preferably from about 600 to about 2,200, and most preferably from about 800 to about 1,600. Notwithstanding the foregoing ranges and values, it is to be understood that practice of the present invention is possible with any chlorinated polybutene, prepared from any commercially available polybutene, having any number average molecular weight between about 400 and 3000. Typical useful polybutenes that are commercially available today include Indupol ® H300 ($\overline{M}n$ 1300) from Amoco; Parapol ® 950 ($\overline{M}n$ 950) or Parapol ® 1300 ($\overline{M}n$ 1300) both from Exxon; Napvis ® 30 ($\overline{M}n$ 1300) or Ultravis ® 10 ($\overline{M}n$ 950) both from British Petroleum and Glissopal ® ES 3250 ($\overline{M}n$ 1000) from BASF.

The amine compound can be a primary amine or a secondary amine compound, so long as the reacting amine group is not a tertiary, and more specifically can be a monamine, a diamine, or a polyamine (that is 3 or more amine groups). The amine compounds useful in preparing the polybutene amine compounds of the present invention are various monoamines, diamines, and polyamines such as cyclic diamines and polyamines, and alkylene diamines and polyamines of the formula

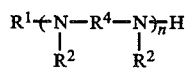

and cyclic monoamines and monoamines of the formula

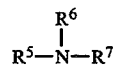

wherein each of $R^1$, $R^2$, $R^3$, $R^5$, $R^6$ and $R^7$, independently, is a hydrogen atom or a hydrocarbyl radical containing from 2 to about 40 carbon atoms, provided however, that at least one of $R^5$, $R^6$, and $R^7$, independently, is said hydrocarbyl, at least one of $R^5$, $R^6$ and $R^7$ is hydrogen, $R^4$ is a divalent hydrocarbon radical containing from 1 to about 18 carbon atoms and n is an integer from 1 to about 10. Generally these hydrocarbyl radicals are aliphatic radicals free from unsaturation and contain from 1 to about 10 carbon atoms. Examples of such various amine compounds include ethylene polyamines, butylene polyamines, propylene polyamines, pentylene polyamines, and the like, cyclic polyamines such as piperazines and N-aminoalkyl substituted piperazines, and the like. Specific non-limiting representative examples of such polyamines also include ethylenediamine, diethylenetriamine, triethylenetetramine, tris-(2-aminoethyl)-amine, propylenediamine, trimethylenediamine, tripropylamine-tetramine, tetraethylenepentamine, and heptaethylenehexamine.

Among the monoamines useful in this invention are those of the formula $HNR^8R^9$ wherein $R^8$ is an alkyl radical of up to 10 carbon atoms and $R^9$ is a hydrogen atom or an alkyl radical of up to 10 carbon atoms. Examples of suitable monoamines are ethylamine, diethylamine, n-butylamine, di-n-butylamine, allylamine, isobutylamine, cocoamine, stearylamine, laurylamine, and methyllaurylamine oleylamine.

Cyclic monoamines are also useful in making the compositions of this invention. The cyclic ring can be substituted with hydrocarbyl radicals such as alkyl or alkenyl. In addition, the ring can also contain other nitrogen atoms including those not having hydrogen atoms bonded to them. Generally, these rings have 3 to 10, preferably 5 or 6 ring members. Among such cyclic monoamines are aziridines, azetidines, pyrolidines, and piperidines.

Examples of preferred amine compounds include octylamine, nonylamine, decylamine, dodecylamine, ethylenediamine, propylenediamine, N,N-dimethylaminopropylamine, diethylenetrlamine, triethylene tetramine, and the like, with ethylenediamine, N,N-dimethylamino-propylamine, and diethylenetriamine being preferred. Inasmuch as a compound high in basic nitrogen is desired, diamines and polyamines are preferred.

The amine compounds of the present invention may also contain one or more hydroxyl groups and, therefore, may include the hydroxymonoamines, hydroxydiamines, hydroxypolyamines, dihydroxymonoamines, dihydroxydiamines, dihydroxypolyamines, polyhydroxymonoamines, polyhydroxydiamines, or polyhydroxypolyamines, or combinations thereof, or combinations of amines containing one or more hydroxyl groups with one or more of the various monoamines, diamines, and polyamines described hereinabove. In addition to the hydroxyl groups, the amine compounds of the present invention may alternatively contain any other substituent group so long as the latter does not interfere with the amination. Typically such groups include esters, ethers, amides, imides, aryls and the like.

The hydroxyl-group-containing amines of the present invention include those compounds where hydroxyl radicals replace one or more hydrogen radicals attached to carbon atoms of the various hydrocarbyl radicals, alkyl radicals, or divalent hydrocarbon radicals of the various monoamine, diamine, and polyamine structures described hereinabove.

Examples of the hydroxyl-group-containing amines useful in this invention include aminoethylethanolamine, diaminopropanol, bis-(2-hydroxyethyl)ethylenediamine, aminohexanol, aminopentanol, and aminobutanol, and the like, with aminoethylethanolamine, diaminopropanol, and bis-(2-hydroxyethyl)ethylenediamine being preferred. Inasmuch as a compound high in basic nitrogen is desired, compounds containing more than one amine group are generally preferred.

It is an important aspect of the present invention to utilize an excess of the amine compound. The excess of amine compound is generally greater than about 1 mole excess amine per mole of chlorinated polybutene, generally from about 1 to about 10 moles excess amine per mole of chlorinated polybutene, preferably from about 3 to about 5 moles excess amine per mole of chlorinated polybutene. Because the process of the present invention allows for the recovery of the amine reactant, use of an excess amount is not of concern.

The reaction of chlorinated polybutene with excess amine must be carried out at an elevated temperature which is generally dependant upon the boiling point of the amine. Accordingly, the reaction temperature is generally at least 100° C., preferably from about 100° C. to about 220° C., more preferably from about 140° C. to about 170° C. Reaction times vary between from about 2 to about 10 hours with 3 to 6 hours being preferred. Where the boiling point of the amine selected is lower than the foregoing temperature range, the reaction can be run under the necessary pressure to develop the temperature without loss of the amine. Otherwise, pressure is not a condition for practice of the present invention. Although use of a solvent is generally not necessary because excess amine will function as a solvent, the present invention does not preclude the use of inert organic solvents. Such solvents include aromatic solvents having a total of from about 6 to about 9 carbon atoms with specific examples including xylene, toluene, $C_9$ aromatic, and the like; an aliphatic solvent having from about 6 to about 10 carbon atoms with specific examples including isooctane, heptane, cyclohexane, and the like, or various aliphatic substituted aromatic compounds, and the like, as well as combinations thereof.

When the reaction between the chlorinated polybutene and excess amine is completed, the reaction mixture may be neutralized through the addition of sodium methylate at reaction temperature, or the reaction mixture may be cooled before the addition of the sodium methylate. The reaction mixture is generally cooled to a temperature between about 70° C. and about 150° C., preferably about 90° C. to about 130° C. The sodium methylate, also known as sodium methoxide, is generally added as a solution in methanol. An alcohol (methanol) by-product results which is removed in a timely fashion and manner along with any methanol solvent introduced into the reaction mixture with the added sodium methylate. A timely fashion for removal may occur during formation or at another state of the process so long as the by-product(s) is not present in the polybutene amine composition. A timely manner for removal can include, for instance, by distillation or other means readily known to those skilled in the art.

A slight excess of sodium methylate is generally utilized, generally about a 5 percent excess with respect to theoretical chlorine in the reaction mixture, which exists mostly as amine hydrochloride. During or after the sodium methylate addition, the reaction temperature is generally increased to a temperature between about 100° C. and about 200° C., preferably about 140° C. to about 170° C. Again, the specific temperatures accompanying this stage of the process are amine dependant. The neutralization reaction is generally complete after 1 to 2 hours.

In lieu of sodium, the step of neutralizing the reaction mixture can be practiced with alkoxides of other alkali metals or alkaline earth metals. Similarly, the alkoxides are not limited to methoxides, but include those having the general formula $$M(OR)_x$$

where M is an alkali metal or alkaline earth metal; R is an aliphatic group of substantially any length but practically, one having from 1 to about 4 carbons, and x is 1 or 2. Further still, in lieu of the alkali metal and alkaline earth metal alkoxides, one may employ an alkali metal or alkaline earth metal amide. Suitable amides include amine derivatives of any of the amines disclosed herein that can be reacted with the chlorinated polybutenes. Thus, it is to be understood that while the present invention has been exemplified via use of sodium methylate, neutralization could as readily be conducted with one of many other alkoxides or amides which will produce alcohol or ammonia by-products, respectively.

In any instance, substantially no water is produced as a by-product. For example, the reaction of a polybutene polyamine (R—NH$_3$Cl) and sodium methylate (NaOMe) is as follows $$R-NH_3Cl + NaOMe \rightarrow R-NH_2 + MeOH + NaCl$$

With sodium amide, the reaction is as follows $$R-NH_3Cl + NaNH_2 \rightarrow R-NH_2 + NH_3 + NaCl$$

After the neutralization reaction is complete, the reaction mixture is optionally cooled to a temperature between about 120° C. and about 130° C., and the slight excess of sodium methylate present is neutralized by the addition of an acid that will substantially produce no water as a by-product. Typical acids include ammonium chloride, which is preferred, as well as ammonium salts of other common inorganic acids such as phosphoric, sulfuric and the like as well as organic acids such as acetic, citric and the like.

Again, in any instance, substantially no water is produced as a by-product. For example, the reaction of ammonium chloride and sodium methylate (NaOMe) is as follows $$NH_4Cl + NaOMe \rightarrow NH_3 + MeOH + NaCl$$

With sodium amide, the reaction is as follows $$NH_4Cl + NaNH_2 \rightarrow 2NH_3 + NaCl$$

Ammonium chloride may also be added without prior cooling of the reaction, and it may be added by itself or optionally in a slurry of the amine. The ratio of ammonium chloride added to the amount of excess sodium methylate still present after the neutralization reaction is complete is generally from about 2 moles ammonium chloride per mole of remaining excess sodium methylate to about 3 moles ammonium chloride per mole of remaining excess sodium methylate. If the reaction temperature is cooled prior to the addition of the ammonium chloride, it is again increased after the addition of the ammonium chloride to a temperature between about 100° C. and about 200° C., preferably about 140° C. to about 170° C., the specific temperature being amine dependant. The reaction mixture is generally held at this temperature for an additional 1 to 2 hours.

The present invention provides a process for the manufacture of polybutene amine fuel deposit control additives wherein substantially all of the excess amine, a valuable reactant, can be recovered from the reaction mixture by vacuum stripping along with a nitrogen purge. Generally speaking, the temperature and pressures to be employed are related to the amine selected. For example, in the instance of aminoethylthanolamine, the vacuum stripping step is generally conducted at gradually increasing temperatures between 50° C. and 230° C., preferably 140° C. to 210° C., more preferably 170° C. to 200° C., and most preferably to a final temperature of about 200° C. Ultimate vacuum conditions are generally from about 20 mm to 10 mm Hg.

Recovery of the amine following amination of the chlorinated polybutene is not limited to following the step of reacting, or neutralizing, the sodium methylate with an acid; for instance, It is within the scope of the present invention to conduct a partial strip of the amine prior to reaction (neutralization) with sodium methylate or other compound. Thus, as used herein, the recitation regarding removal or excess amine compound shall not be limited to removal following reaction with sodium methylate but shall also include recovery at other stages of the process, including incremental steps.

in either instance, following recovery of substantially all of the excess amine, the crude reaction mixture is cooled to room temperature and filtered by any one of a number of acceptable filtration techniques including use of a centrifuge, a pressure filter, a neuch filter, a plate and frame filter and the like, to remove inorganic material, which consists mainly of sodium chloride. The filter cake in the pressure filter is washed with a small amount of a solvent, preferably C9 aromatic solvent, toluene or a polyether, and the filter cake is then dried for disposal. The final product is generated by dilution with solvent, preferably C9 aromatic solvent or toluene, to the desired percent basic nitrogen. The solvent used to wash the filter cake may be used in this dilution. The percent basic nitrogen in the final product is generally greater than 0.4 percent, preferably greater than 1 percent, and usually about 0.9 percent to 1.3 percent.

In order to demonstrate practice of the present invention, the following examples are provided. The specific embodiments described below are intended to illustrate, but not to limit, the present invention.

Polybutene amine fuel deposit control additives were prepared according to the following general procedure: chlorinated polybutene was reacted with an excess of polyamine; the reaction mixture was optionally cooled; the reaction mixture was neutralized with a slight excess of sodium methylate and the methanol by-product was removed by distillation as it was formed; the excess sodium methylate was neutralized with ammonium chloride; excess amine was removed by vacuum stripping with a nitrogen purge; the reaction mixture was cooled and a small amount of aromatic solvent was added to Improve viscosity; the reaction mass was filtered to remove inorganics; the filter cake was washed with a small amount of aromatic solvent and dried for disposal; and the final product was diluted with an aromatic solvent to the desired percent basic nitrogen.

EXAMPLE NO. 1

A mixture of 479.2 g chlorinated Exxon Parapol ® 1300 polybutene (containing 3.7 percent by weight chlorine or 0.5 mole equivalent of chlorine), and 312.0 g (3.0 mole) aminoethylethanolamine (AEEA) was heated to 170° C. with stirring under nitrogen in a 1 liter round bottom flask equipped with a reflux condenser and mechanical stirrer. The reaction mixture was heated for 6 hours at 170° C. and then cooled to room temperature. The crude unpurified mixture (791.2 g) containing aminated product, AEEA hydrochloride, and excess AEEA, was stored at room temperature for later use.

EXAMPLE NO. 2

A 238.0 g portion of the Example No. 1 reaction mixture (containing 0.15 mole equivalent of theoretical chlorine which occurs mostly as AEEA hydrochloride) was heated to 125° C. with stirring under nitrogen in a 500 ml round bottom flask equipped with a reflux condenser, Dean-Stark trap, and mechanical stirrer. A 25 percent solution of sodium methoxide in methanol (34.0 g, 0.16 mole sodium methoxide) was slowly added to the stirring reaction mixture through a dropping funnel over a period of 5 hours. During the first 2 hours of addition, the reaction batch temperature was increased from 125° C. to 170° C. Throughout the entire addition, methanol was distilled from the reaction batch and collected in the Dean-Stark trap. A total of 28.4 g methanol was collected.

After cooling the batch to 130° C., 0.8 g (0.015 mole) ammonium chloride was added all at once, and the batch temperature was maintained at 130° C. for 0.5 hour. The batch temperature was then increased to 170° C. where it was held for 2 hours. The reaction mixture was finally distilled under 20 mm vacuum to remove excess AEEA. During the 1.5 hour vacuum distillation, the distillation pot temperature rose from 142° C. to 204° C., and 97.4 g AEEA were collected. The crude reaction mixture was cooled to room temperature and filtered through a pressure filter to remove sodium chloride. The filter cake in the pressure filter was washed with a small amount of toluene. The filtrate was flash evaporated in a Rotovac to give 117.8 g of the undiluted aminated product. The product was diluted with 60.2 g toluene to give 178.0 g of diluted aminated product (66 percent by weight product, 34 percent by weight toluene) as a pale brown liquid, which analyzed to give 0.98 percent basic nitrogen, 0.16 percent chlorine, 0.13 percent water soluble amine, and no detectable sodium.

EXAMPLE NO. 3

A 158.23 g portion of a reaction mixture prepared according to Example No. 1 (containing 0.10 mole equivalent of theoretical chlorine) was heated to 125° C. with stirring under nitrogen in a 500 ml round bottom flask equipped with a reflux condenser, Dean-Stark trap, and mechanical stirrer. A 25 percent solution of sodium methoxide in methanol (22.7 g, 0.105 mole sodium methoxide) was slowly added to the stirring reaction mixture through a dropping funnel over a period of 2 hours, during which time the reaction batch temperature rose to 170° C. A total of 20.0 g methanol was collected in the Dean-Stark trap during the sodium methoxide addition.

After cooling the batch to 120° C., 0.55 g (0.01 mole) ammonium chloride was added all at once, and the batch was then heated at 170° C. for 1 hour. The crude reaction mixture was worked up as described in Example No. 2 to give 90.8 g of the undiluted aminated product. Dilution with 40.2 g toluene gave 131.0 g of the diluted aminated product (69 percent by weight product, 31 percent by weight toluene) as a pale brown liquid, which analyzed to give 1.03 percent basic nitrogen, 0.45 percent chlorine, 0.20 percent water soluble amine, and no detectable sodium.

EXAMPLE NO. 4

A 158.5 g portion of a reaction mixture prepared according to Example No. (containing 0.10 mole equivalent of theoretical chlorine) was reacted and worked up as described in Example No. 3, starting with 2.27 g (0.105 mole sodium methoxide) of a 25 percent sodium methoxide in methanol solution, and 0.6 g (0.011 mole) ammonium chloride. The aminated product (80.0 g) was diluted with 32.0 g toluene to give 112.0 g of diluted aminated product (71 percent by weight product, 29 percent by weight tolene) as a pale brown liquid, which analyzed to give 1.08 percent basic nitrogen, 0.40 percent chlorine, 0.17 percent water soluble amine, and 4.5 ppm sodium.

EXAMPLE NO. 5

A mixture of 191.7 g chlorinated Exxon Parapol ® 1300 polybutene (containing 3.7 percent by weight chlorine or 0.2 mole equivalent of chlorine), and 104.0 g (1.0 mole) aminoethylethanolamine (AEEA) was reacted as described in Example No. 1, to give 295.7 g of the crude unpurified reaction mixture.

EXAMPLE NO. 6

A 149.0 g portion of reaction mixture prepared according to Example No. 5 (containing 0.10 mole equivalent of theoretical chlorine) was reacted and worked up as described in Example No. 3, starting with 22.7 g (0.105 mole sodium methoxide) of a 25 percent sodium methoxide in methanol solution, and 0.6 g (0.11 mole) ammonium chloride. The aminated product (100.0 g) was diluted with 40.0 g toluene to give 140.0 g of diluted aminated product (71 percent by weight product, 29 percent by weight toluene) as a pale brown liquid, which analyzed to give 1.17 percent basic nitrogen. 0.44 percent chlorine, 0.62 percent water soluble amine, and no detectable sodium.

EXAMPLE NO. 7

A 158.5 g portion of a reaction mixture prepared according to Example No. 1 (containing 0.10 mole equivalent of theoretical chlorine) was reacted and worked up as described in Example 3, starting with 22.8 g (0.105 mole sodium methoxide) of a 25 percent sodium methoxide in methanol solution, and 0.6 g (0.011 mole) ammonium chloride. The aminated product (97.0 g) was diluted with 40.0 g toluene to give 137.0 g of diluted aminated product (71 percent by weight product, 29 percent by weight toluene) as a pale brown liquid, which analyzed to give 1.12 percent basic nitrogen, 0.16 percent chlorine, 0.38 percent water soluble amine, and no detectable sodium.

EXAMPLE NO. 8

A mixture of 95.8 lbs chlorinated Exxon Parapol ® 1300 polybutene (containing 3.7 percent by weight chlorine or 0.1 lb-mole equivalent of chlorine), and 62.4 lbs (0.6 lb-mole) aminoethylethanolamine (AEEA) was heated to 170° C. under nitrogen in a 50 gallon jacketed glass lined reactor equipped with oil heating, a crow foot glass agitator, glass overheads, and receiver. The reaction mixture was heated for 4 hours at 170° C. to 175° C.

After reacting for 4 hours, 22.7 lbs of a 25 percent sodium methoxide methanol solution (0.105 lb-mole sodium methoxide) was slowly added to the stirring reaction mixture under nitrogen over a 45 minute time period. During the addition, methanol distilled out of the reaction batch at a vapor temperature of 78° C. to 84° C., and the batch temperature decreased from 175° C. to 148° C.

After completing the sodium methoxide in methanol solution addition, the batch temperature was increased to 168° C. The batch was heated at 168° C. to 170° C. for 1 hour. Ammonium chloride (0.7 lb, 0.013 lb-mole) was added to the stirring reaction mixture all at once in a slurry with 2.5 lb AEEA, and the batch temperature was maintained at 168° C. to 171 ° C. for an additional hour.

The reaction batch was cooled to 71° C., and a 26 inch vacuum was applied with a Nash vacuum pump, to begin vacuum distilling the excess AEEA. The reaction batch temperature was increased, and over a 4.5 time period, the AEEA distilled at a 192° C. to 204° C. vapor temperature. During the distillation, the batch temperature Increased from 171° C. to 204° C. After 4.5 hours, a Bush pump was used to achieve a 10 mm vacuum. Distillation continued for an additional 1 hour at 197° C. to 205° C. vapor temperature, and a 202° C. to 207° C. reaction batch temperature. At this point, an in-process sample was taken which analyzed for 0.44 percent water soluble amine, and the vacuum distillation was stopped.

A portion of the crude reaction mixture was diluted with C-9 aromatic solvent and filtered through a pressure filter to remove sodium chloride giving 35 lbs of a light brown liquid (70 percent by weight product, 30 percent by weight C-9 aromatic solvent). This sample analyzed to give 1.05 percent basic nitrogen, 0.30 percent chlorine, 0.16 percent water soluble amine, and no detectable sodium.

EXAMPLE NO. 9

A mixture of 95.8 lbs chlorinated Exxon Parapol ® 1300 polybutene (containing 3.7 percent by weight chlorine or 0.1 lb-mole equivalent of chlorine), and 42.0 lbs (0.7 lb-mole) ethylenediamine (EDA) was heated to 145° C. under nitrogen in a sealed 50 gallon jacketed glass lined reactor equipped with oil heating, a crow foot glass agitator, glass overheads and receiver. The reaction batch was heated for 4 hours at 144° C. to 146° C., under 13.5-15.0 psi pressure.

The batch was cooled to 93° C. and vented, and 22.7 lbs of a 25 percent sodium methoxide in methanol solution (0.105 lb-mole sodium methoxide) was slowly added to the stirring reaction mixture under nitrogen over an 18 minute time period. During the addition, no methanol was distilled. The batch temperature was increased to 100° C., at which point distillation began. The batch temperature was held at 100° C. to 103° C.

for 1 hour, while methanol distilled at a 83° C. to 91° C. vapor temperature.

Ammonium chloride (0.5 lb, 0.0093 lb-mole) was added to the stirring reaction mixture in a slurry with 2.5 lbs EDA at 103° C. Heating was continued for 1 hour at 100° C. to 103° C.

The reaction batch was cooled to 57° C. and a 26 inch vacuum was applied with a Nash vacuum pump to begin vacuum distillating DEA. The batch temperature was increased to 63° C. under 26 inches of vacuum, at which point DEA began to distill. Distillation continued for 3 hours at 43° C. to 67° C. vapor temperature and 63° C. to 116° C. reaction batch temperature. A Bush pump was then used to achieve 18 mm vacuum, and distillation was continued for an additional 2 hours at 141° C. to 148° C. vapor temperature and 147° C. to 149° C. batch temperature. An in-process sample analyzed for 0.4 percent water soluble amine. A portion of the reaction batch was diluted with C-9 aromatic solvent (70 percent by weight aminated product, 30 percent by weight C-9 aromatic solvent) to give 275 lbs of a light brown liquid which analyzed to give 1.21 percent basic nitrogen, 0.14 percent water soluble amine, 0.39 percent chlorine, and no detectable sodium.

As evident from the foregoing examples, the process of the present invention yields aminated polybutene products having a basic nitrogen content of greater than one percent by weight so that upon dilution, basic nitrogen contents of about one percent are obtained. Prior to dilution, basic nitrogen in the reacted product will depend upon the amine employed. Dilution is a conventional step primarily for viscosity purposes which does not form part of the present invention. Dilution to a percent basic nitrogen of about one percent by weight is currently accepted by the oil companies as an appropriate amount for use of a deposit control fuel additive. Nevertheless, it is to be appreciated that other dilutions, as well as the lack thereof are within the skill of the art, depending upon the intended use of the aminated product.

As is also to be appreciated by those skilled in the art, the present invention provides for the production of aminated polybutene deposit control additives for fuels. Detergents, pour point depressants, viscosity modifiers and the like developed for blending with fuels and oils are not effective as deposit control additives primarily because the molecular weight is different and/or because of the basic nitrogen content.

In similar fashion, it is to be appreciated that practice of the present invention is not limited to the specifics disclosed herein, the examples having been provided merely to enable those skilled in the art to have means by which to evaluate the present invention. Accordingly, it is well within the scope of this invention to vary the reaction conditions set forth herein as may be necessary to accommodate the reactants selected. Non-critical steps in the recovery of the product can be varied depending on the equipment employed as well as the preference of the operator.

Although the foregoing specification has been directed toward the amination of chlorinated polybutene Including recovery of the amine, it should be understood that the step of neutralizing an amine hydrochloride with sodium methoxide and then reacting any excess sodium methoxide with ammonium chloride as described in this invention affords a general anhydrous method of amine recovery. The process of amine recovery can also be employed independent of the polybutene amine process in those situations where a waste stream of amine hydrochloride in amine is produced. Furthermore, it is applicable to other amine salts that can be liberated by reacting the salt with sodium methoxide, e.g. hydrosulfate salts of amines.

Based upon the foregoing disclosure, it should now be apparent that the process of the present Invention will carry out the objects set forth hereinabove. It is, therefore, to be understood that any variations evident fall within the scope of the claimed invention and thus, the selection of specific reactants as well as processing conditions can be determined without departing from the spirit of the invention herein disclosed and described. In particular, deposit control fuel additives according to the present Invention are not necessarily limited to those having the amines exemplified herein or the mole ratios employed. Moreover, as noted hereinabove, other reaction temperatures can be substituted for those disclosed herein. Thus, the scope of the invention shall include all modifications and variations that may fall within the scope of the attached claims.

What is claimed is:

1. A process for preparing a polybutene amine composition comprising the steps of:
   reacting a chlorinated polybutene with an excess of at least one mole of at least one type of an amine compound per mole of said chlorinated polybutene at a reaction temperature of at least about 100° C.;
   neutralizing the reaction mixture with a base selected from the group of alkali metal and alkaline earth metal alkoxides and amides with formation of one of an alcohol or ammonia, respectively;
   neutralizing any excess base with an acid that will produce essentially no waters as a by-product;
   recovering the polybutene amine composition; and removing excess of said amine compound.

2. A process according to claim 1, wherein said reaction temperature is from about 100° C. to about 220° C., and wherein said excess of said amine is from about 1 mole to about 10 moles per mole of said chlorinated polybutene.

3. A process according to claim 2, wherein said reaction temperature is from about 140° C. to about 170° C., and wherein said excess of said amine is from about 4 moles to about 8 moles per mole of said chlorinated polybutene.

4. A process according to claim 3, wherein said reaction temperature is from about 170° C. and wherein said excess of said amine is from about 5 moles to about 7 moles per mole of said chlorinated polybutene.

5. A process according to claim 1, wherein said amine compound is selected from the group consisting of primary and secondary monoamines, diamines and polyamines, hydroxymonoamines, hydroxydiamines, hydroxypolyamines, dihydroxymonoamines, dihydroxydiamines, dihydroxypolyamines, polyhydroxymonoamines, polyhydroxydiamines, polyhydroxypolyamines, and combinations thereof.

6. A process according to claim 5, wherein said amine compound is selected from the group consisting of dimethylaminopropylamine, diethylenetriamine, ethylenediamine, aminoethylethanolamine, diaminopropanol, or combinations thereof.

7. A process according to claim 1, wherein said acid is selected from the group consisting of ammonium salts of inorganic and organic acids.

8. A process according to claim 7, wherein said acid is ammonium chloride.

9. A process according to claim 1, wherein substantially all of the excess amine is recovered.

10. A process according to claim 1, wherein said process is carried out in the absence of inorganic bases.

11. A process according to claim 1, wherein said process includes the additional step of cooling the reaction mixture prior to said step of neutralizing.

12. A process according to claim 1, wherein said excess amine Is removed by vacuum stripping.

13. A process according to claim 1, including the additional step of diluting the polybutene amine composition with aromatic solvent sufficient to provide a basic nitrogen content of about one percent by weight.

14. A deposit-control fuel additive comprising the composition made according to the process of claim 1.

* * * * *